United States Patent
Ji et al.

(10) Patent No.: US 12,362,886 B2
(45) Date of Patent: Jul. 15, 2025

(54) FEEDBACK INFORMATION TRANSMISSION METHOD AND APPARATUS

(71) Applicant: VIVO MOBILE COMMUNICATION CO., LTD., Guangdong (CN)

(72) Inventors: Zichao Ji, Guangdong (CN); Xueming Pan, Guangdong (CN); Huaming Wu, Guangdong (CN); Siqi Liu, Guangdong (CN); Shixiao Liu, Guangdong (CN); Shuyan Peng, Guangdong (CN); Wei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 448 days.

(21) Appl. No.: 17/666,662

(22) Filed: Feb. 8, 2022

(65) Prior Publication Data
US 2022/0158803 A1 May 19, 2022

Related U.S. Application Data

(63) Continuation of application No. PCT/CN2020/106833, filed on Aug. 4, 2020.

(30) Foreign Application Priority Data

Aug. 9, 2019 (CN) .......................... 201910736646.9

(51) Int. Cl.
*H04L 5/00* (2006.01)
*H04L 1/1812* (2023.01)
(52) U.S. Cl.
CPC .......... *H04L 5/0055* (2013.01); *H04L 1/1812* (2013.01)

(58) Field of Classification Search
None
See application file for complete search history.

(56) References Cited

U.S. PATENT DOCUMENTS

| | | |
|---|---|---|
| 2012/0008609 A1 | 1/2012 | Ma et al. |
| 2015/0029990 A1 | 1/2015 | Marinier et al. |
| 2017/0207944 A1 | 7/2017 | Zhang et al. |
| 2018/0103488 A1 | 4/2018 | Marinier et al. |

(Continued)

FOREIGN PATENT DOCUMENTS

| | | |
|---|---|---|
| CN | 101686113 A | 3/2010 |
| CN | 102014509 A | 4/2011 |

(Continued)

OTHER PUBLICATIONS

3GPP TSG RAN WG1 Meeting#97, Sidelink Physical Structure for NR V2X Communication May 13-17, 2019_R1-1907906 (Year: 2019).*

(Continued)

*Primary Examiner* — Donald L Mills
(74) *Attorney, Agent, or Firm* — Price Heneveld LLP

(57) ABSTRACT

The present disclosure discloses a feedback information transmission method and apparatus. The feedback information transmission method is applied to a receive terminal and includes: obtaining information about a feedback channel format, and generating a feedback channel according to the information about the feedback channel format, where the feedback channel format employs a sequence form; and sending feedback information to a transmit terminal through the feedback channel.

19 Claims, 5 Drawing Sheets

---

Obtain information about a feedback channel format, and generate a feedback channel according to the information about the feedback channel format, where the feedback channel format employs a sequence form — 101

Send feedback information to a transmit end terminal through the feedback channel — 102

(56) References Cited

U.S. PATENT DOCUMENTS

| | | |
|---|---|---|
| 2019/0173703 A1 | 6/2019 | Gao |
| 2020/0187191 A1 | 6/2020 | Lin et al. |
| 2021/0185706 A1 | 6/2021 | Park et al. |
| 2022/0060285 A1 | 2/2022 | Zhao |
| 2022/0077962 A1 | 3/2022 | Zhao |

FOREIGN PATENT DOCUMENTS

| | | | | |
|---|---|---|---|---|
| CN | 102077639 A | 5/2011 | | |
| CN | 102148672 A | 8/2011 | | |
| CN | 102437901 A | 5/2012 | | |
| CN | 109792326 A | 5/2019 | | |
| CN | 109792369 A | 5/2019 | | |
| EP | 3500005 A1 * | 6/2019 | ........... | H04L 1/1861 |
| KR | 20180112862 A | 10/2018 | | |
| KR | 20190067762 A | 6/2019 | | |
| RU | 2669585 C1 | 10/2018 | | |

OTHER PUBLICATIONS

Intel Corporation, "Sidelink Physical Structure for NR V2X Communication", 3GPP TSG RAN WG1 Meeting #97, R1-1907906, Reno, USA, May 13-17, 2019.

Intel Corporation, "Sidelink Physical Structure for NR V2X Communication", 3GPP TSG RAN WG1 Meeting #97, R1-1906794, Reno, USA, May 13-17, 2019.

Huawei, "Sidelink physical layer structure for NR V2X", 3GPP TSG RAN WG1 Meeting #97, R1-1906007, Reno, USA, May 13-17, 2019.

Ericsson, "Enhanced PUCCH design details", 3GPP TSG RAN WG1 Meeting #97, R1-1907460, Reno, USA, May 13-17, 2019.

Wilus Inc., "SUL signals and channels for NR-unlicensed", 3GPP TSG RAN WG1 Meeting #97, R1-1907380, Reno, USA, May 13-17, 2019.

Speadtrum Communications, "Discussion on physical layer structure for sidelink", 3GPP TSG RAN WG1 #97, R1-1906361, Reno, USA, May 13-17, 2019.

AT&T, "Physical layer procedures for NR sidelink design" 3GPP TSG RAN WG1 #96 R1-1901896, Athens, Greece, Feb. 25-Mar. 1, 2019.

Intel Corporation, "Sidelink physical layer procedures for NR V2X Communication", 3GPP TSG RAN WG1 Ad-Hoc Meeting 1901, $1-1900481 Taipei, Taiwan, Jan. 21-25, 2019.

Samsung, "Feature lead summary#4 for 7.2.4.1 Physical layer structure for sidelink" 3GPP TSG RAN WG1 #97 Meeting, R1-1907924, Reno, USA, May 13-17, 2019.

CATT, "Sidelink physical layer structure in NR V2X," R1-1906314, 3GPP TSG RAN WG1 Meeting #97, May 13-17, 2019, Reno, USA.

* cited by examiner

FEEDBACK INFORMATION TRANSMISSION METHOD AND APPARATUS

CROSS-REFERENCE TO RELATED APPLICATIONS

This application is a continuation application of International Application No. PCT/CN2020/106833 filed on Aug. 4, 2020, which claims priority to Chinese Patent Application No. 201910736646.9, filed on Aug. 9, 2019 in China, which are incorporated herein by reference in their entireties.

TECHNICAL FIELD

The present disclosure relates to the field of communications technologies, and in particular, to a feedback information transmission method and apparatus.

BACKGROUND

To improve reliability and effectiveness of sidelink (Sidelink, SL) transmission, SL hybrid automatic repeat request (HARQ) is introduced into new radio (NR) vehicle to everything (V2X). On an SL, as shown in FIG. 1, a transmit node sends data information to a receive node, and the receive node determines whether the data is successfully received. If the data is successfully received, the receive node feeds back an acknowledgment (ACK) to the transmit node, and otherwise, feeds back a negative acknowledgment (NACK).

To enable the SL to carry ACK/NACK feedback information, NR V2X supports a new SL channel, namely, physical sidelink feedback channel (PSFCH).

SUMMARY

Embodiments of the present disclosure provide a feedback information transmission method and apparatus.

According to a first aspect, some embodiments of the present disclosure provide a feedback information transmission method, applied to a receive terminal and including:
- obtaining information about a feedback channel format, and generating a feedback channel according to the information about the feedback channel format, where the feedback channel format employs a sequence form; and
- sending feedback information to a transmit terminal through the feedback channel.

According to a second aspect, some embodiments of the present disclosure provide a feedback information transmission apparatus, applied to a receive terminal and including:
- a generation module, configured to obtain information about a feedback channel format, and generate a feedback channel according to the information about the feedback channel format, where the feedback channel format employs a sequence form; and
- a sending module, configured to send feedback information to a transmit terminal through the feedback channel.

According to a third aspect, some embodiments of the present disclosure further provide a terminal. The terminal includes a processor, a memory, and a computer program that is stored in the memory and capable of running on the processor, and when the computer program is executed by the processor, the steps of the feedback information transmission method described above are implemented.

According to a fourth aspect, some embodiments of the present disclosure provide a computer-readable storage medium. The computer-readable storage medium stores a computer program, and when the computer program is executed by a processor, the steps of the feedback information transmission method described above are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following descriptions show merely some embodiments of the present disclosure, and a person of ordinary skill in the art may still derive other drawings from these accompanying drawings.

DESCRIPTION OF EMBODIMENTS

Figure 1:
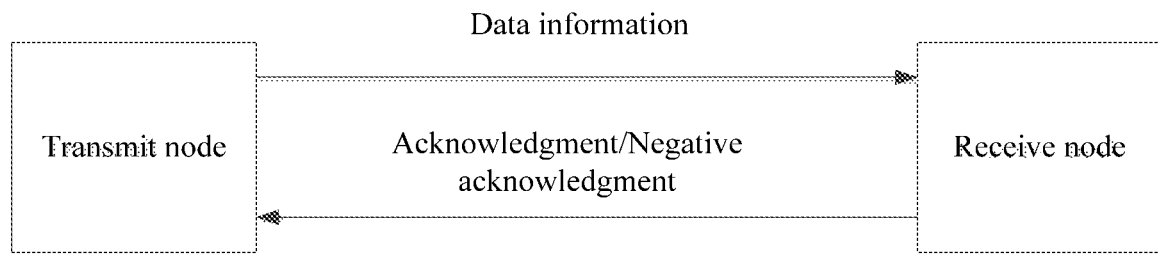
FIG. 1 is a schematic diagram illustrating a transmit node transmitting data information to a receive node and the receive node feeding back information to the transmit node.

Example embodiments of the present disclosure will be described in more detail below with reference to the accompanying drawings. Although the example embodiments of the present disclosure are shown in the accompanying drawings, it should be understood that the present disclosure can be implemented in various forms without being limited by the embodiments described herein. Instead, these embodiments are provided in order to provide a more thorough understanding of the present disclosure and to be able to convey the scope of the present disclosure to a person skilled in the art.

In the specification and claims of this application, the terms "first", "second", and the like are intended to distinguish between similar objects and do not necessarily describe a specific order or sequence. It should be understood that the numbers termed in such way are interchangeable in appropriate circumstances so that the embodiments of this application described herein can be implemented in an order other than the order illustrated or described herein. Moreover, the terms "include", "comprise" and any other variants thereof mean to cover non-exclusive inclusions, for example, a process, method, system, product, or device that includes a list of steps or units is not necessarily limited to those expressly listed steps or units, but may include other steps or units not expressly listed or inherent to such process, method, product, or device. In the specification and claims, "and/or" represents at least one of connected objects.

The technology described in this specification is not limited to long term evolution (LTE)/LTE-advanced (LTE-A) systems, but can also be used in various wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system may implement radio technologies such as CDMA2000 and universal terrestrial radio access (UTRA). UTRA includes wideband CDMA (WCDMA) and other CDMA variants. The TDMA system can implement radio technologies such as global system for mobile communications (GSM). The OFDMA system can implement radio technologies such as ultra-mobile broadband (UMB), evolved-UTRA (E-UTRA), IEEE 802.11 (Wi-Fi), IEEE 802.16 (WiMAX), IEEE 802.20, and flash-OFDM. UTRA and E-UTRA are part of the universal mobile telecommunications system (UMTS). LTE and more advanced LTE (for example, LTE-A) are new UMTS versions using E-UTRA. UTRA, E-UTRA, UMTS, LTE, LTE-A, and GSM are described in the literature from an organization called 3rd generation partnership project (3GPP). CDMA2000 and UMB ared escribed in the literature from an organization called "3rd generation partnership project 2" (3GPP2). The technology described in this specification can be used not only in the systems and radio technologies mentioned above, but also in other systems and radio technologies. However, the following descriptions describe an NR system for example purposes, and NR terms are used in most of the following descriptions, although these technologies can also have other applications than application to an NR system.

The following descriptions provide examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

To improve reliability and effectiveness of sidelink (SL) transmission, SL hybrid automatic repeat request (HARQ) is introduced into new radio (NR) vehicle to everything (V2X). On an SL, as shown in FIG. 1, a transmit node sends data information to a receive node, and the receive node determines whether the data is successfully received. If the data is successfully received, the receive node feeds back an acknowledgment (ACK) to the transmit node, and otherwise, feeds back a negative acknowledgment (NACK).

To enable the SL to carry ACK/NACK feedback information, NR V2X supports a new SL channel, namely, physical sidelink feedback channel (PSFCH), for which the following channel formats may be used: (1) sequence based short feedback channel format (sequence based short PSFCH format); (2) sequence based long feedback channel format (sequence based long PSFCH format); (3) non-sequence based short feedback channel format (short PSFCH format). The (1) sequence based short feedback channel format is a channel format supported by NR V2X. The sequence based short feedback channel format uses physical uplink control channel (PUCCH) format 0 as a reference. PUCCH format 0 is a short channel format, and occupies one or two symbols in time domain and occupies one physical resource block (PRB) in frequency domain. PUCCH format 0 is a channel format based on code division, and each channel has 12 orthogonal codes based on cyclic shift (CS).

Figure 2:
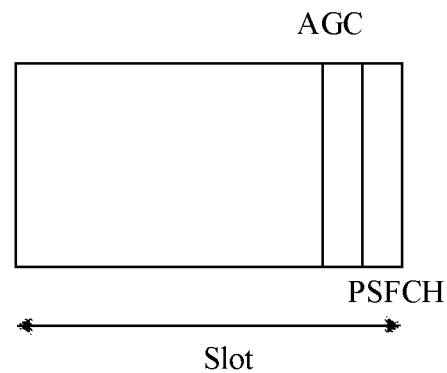
FIG. 2 is a schematic diagram illustrating an SL PSFCH being located in a last symbol or last two symbols of each slot.

As shown in FIG. 2, an SL PSFCH is located in a last symbol or last two symbols of each slot, and an automatic gain control (AGC) time is preceding the PSFCH. The AGC time allows a terminal (UE) to adjust an optimal reception point of a receiver. The adjustment time is related to a frequency domain width occupied by an AGC symbol. A larger frequency domain width occupied by the AGC symbol leads to a shorter time required by AGC. Therefore, AGC needs to occupy enough wide frequency domain bandwidth. In addition, bandwidths of AGC and PSFCH should be as consistent as possible. Therefore, the PSFCH should occupy enough bandwidth. When a physical sidelink shared channel (PSSCH) is transmitted, the first symbol may be used for AGC adjustment. When receiving transmission of the PSSCH, a receive end expects to complete AGC adjustment in one symbol. When the PSSCH is being received, the PSSCH occupies at least one sub-channel, including a plurality of PRBs. Therefore, the receiver can complete AGC adjustment in a short time. However, the PSFCH may possibly occupy a narrower bandwidth, so that AGC adjustment requires a plurality of symbols, thus reducing SL resource utilization.

Figure 3:
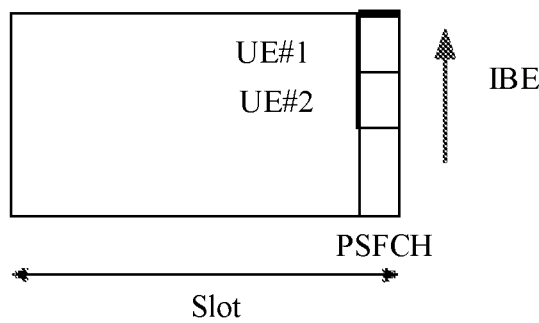
FIG. 3 is a schematic diagram illustrating in-band emission occurring when two transmit user equipments UEs simultaneously transmit information to one receive UE during SL transmission.

Assuming that two transmit (TX) UEs simultaneously transmit information to one receive (RX) UE during SL transmission, one TX UE nearer to the RX UE than the other UE, if the two TX UEs select resources with similar frequencies for transmission, the RX UE may not be able to receive data sent by the farther TX UE, because some energy may be leaked to a sideband during transmission of the nearer TX UE, that is, in-band emission (IBE) causes sideband interference. As shown in FIG. 3, when the sideband interference is significant in energy relative to a transmission signal, the RX UE cannot receive the transmission signal.

PUCCH format 0 uses a length-12 ZC sequence as a code length, which occupies one PRB. If PUCCH format 0 is reused on an SL, because the code length of PUCCH format 0 is relatively short, a longer AGC adjustment time is required. In this case, a plurality of AGC symbols need to be configured by a system, reducing SL resource utilization. In addition, PUCCH format 0 is mapped onto uplink resources only through CS code division multiplexing, which may fail to meet requirements of a large quantity of UEs for a large quantity of feedback resources. In particular, for multicast communication, each RX UE requires a separate feedback resource. In addition, because there is a far-near effect in IBE and/or SL transmission, orthogonality of code division multiplexing may be damaged, resulting in coding and demodulation errors and transmission reliability degradation. In addition, PUCCH format 0 does not take into account a case that a plurality of RX UEs select a same code sequence for feedback.

To resolve the foregoing problem, some embodiments of the present disclosure provide a feedback information transmission method and apparatus, so that an automatic gain control time for a feedback channel can be optimized.

Figure 4:
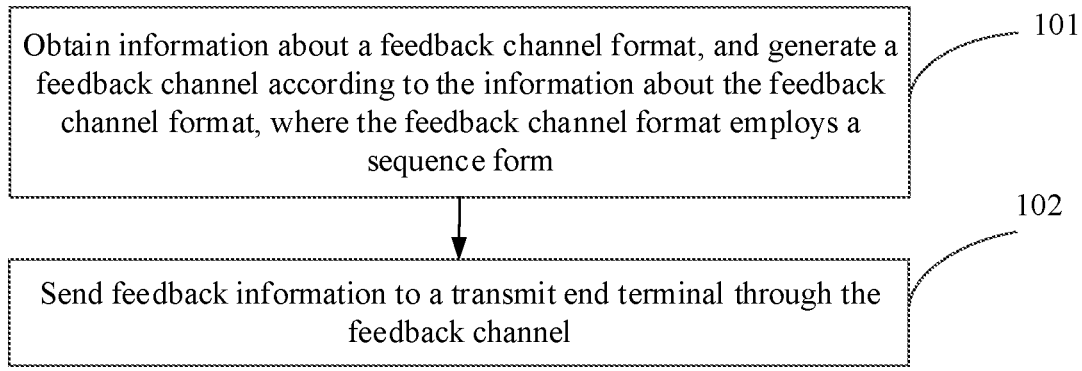
FIG. 4 is a schematic flowchart of a feedback information transmission method according to some embodiments of the present disclosure.

Some embodiments of the present disclosure provide a feedback information transmission method applied to a receive terminal. As shown in FIG. 4, the method includes the following steps.

Step 101: Obtain information about a feedback channel format, and generate a feedback channel according to the information about the feedback channel format, where the feedback channel format employs a sequence form.

Step 102: Send feedback information to a transmit terminal through the feedback channel.

In this embodiment, the receive terminal obtains information about a feedback channel format, and generates a feedback channel according to the information about the feedback channel format. The feedback channel format employs a sequence form which may be obtained through sub-sequence extension. In this way, the feedback channel has a large code length, effectively reducing the adjustment time for automatic gain control.

Optionally, the feedback information is sent after the receive terminal receives sidelink data information from the transmit terminal.

Optionally, the obtaining information about a feedback channel format includes obtaining configuration information of the feedback channel format, where the information about the feedback channel format includes N, and the generating a feedback channel includes:

generating a channel sequence that occupies N physical resource blocks PRBs, where N is specified by a protocol or configured or preconfigured by a network side device, and N is an integer greater than or equal to 1; and mapping the channel sequence onto resource elements REs.

Optionally, the information about the feedback channel format further includes M, the channel sequence includes M sub-sequences, and the generating a channel sequence includes at least one of the following:

forming the channel sequence by using M correlated or uncorrelated different sequences;

replicating one sub-sequence M times to obtain the channel sequence;

multiplying at least one sub-sequence by a factor to obtain the channel sequence;

concatenating sub-sequences to obtain the channel sequence; and interleaving sub-sequences to obtain the channel sequence, where M is an integer greater than or equal to 1, M is specified by the protocol or configured or preconfigured by the network side device, a length of the sub-sequence is specified by the protocol or configured or preconfigured by the network side device, and a type of the sub-sequence is specified by the protocol or configured or preconfigured by the network side device. Generating a channel sequence through sub-sequence extension can effectively reduce an AGC adjustment time. In addition, with the near-far effect of code division multiplexing considered, code division multiplexing may be canceled.

Optionally, the factor is an orthogonal cover code (OCC), and a length of the orthogonal cover code is specified by the protocol or configured or preconfigured by the network side device. Alternatively, the length of the orthogonal cover code may be implicitly obtained, for example, the code length being equal to a quantity of sub-sequences.

Optionally, in the case of interleaving sub-sequences to obtain the channel sequence, a quantity of sub-sequences that are interleaved is specified by the protocol or configured or preconfigured by the network side device.

In this embodiment, a long sequence that occupies N PRBs may be directly generated as the channel sequence, or M identical or different sub-sequences may be combined to obtain an extended channel sequence that occupies N PRBs. M is a parameter specified by the protocol or configured or preconfigured by the network side device, and the length of the sub-sequence is also a parameter specified by the protocol or configured or preconfigured by the network side device. A length N of the channel sequence may be implicitly deduced from M. For example, if the protocol specifies that the sub-sequence occupies one PRB, M=N. In addition, the type of the sub-sequence may be specified by the protocol or configured by the network side device or preconfigured by the network side device. The sub-sequence may be a computer generated sequence (CGS), and/or a constant amplitude zero auto correlation (CAZAC) sequence, where the CAZAC sequence includes a ZC sequence (Zad-off Chu sequence).

Optionally, the mapping the channel sequence onto resource elements includes:

mapping the channel sequence onto resource elements in a comb manner or through continuous mapping.

When the protocol specifies that the channel sequence is mapped onto resource elements in the foregoing two mapping manners, one of the manners may be configured or preconfigured for mapping.

Optionally, in the case of mapping the channel sequence onto resource elements in a comb manner, a comb type is specified by the protocol or configured or preconfigured by the network side device, or may be indicated by using physical layer signaling (SCI), and the comb type includes at least one of the following: a quantity of REs for continuous mapping and a gap between REs for discontinuous mapping.

Optionally, a quantity of states of the channel sequence is specified by the protocol or configured or preconfigured by the network side device.

When the channel sequence includes M sub-sequences, the quantity of states of the channel sequence is any one of the following:

the quantity of states of the channel sequence is equal to a sum of quantities of states of sub-sequences, where sequence states of the sub-sequences are not correlated;

the quantity of states of the channel sequence is equal to a product of quantities of states of sub-sequences, where sequence states of the sub-sequences are not correlated;

the quantity of states of the channel sequence is equal to a quantity of states of a sub-sequence, where sequence states of the sub-sequences are always the same; and in the case of multiplying at least one sub-sequence by a factor to obtain the channel sequence, the quantity of states of the channel sequence is equal to a product of a quantity of states of the sub-sequence(s) and a quantity of states of the factor, where sequence states of the sub-sequence(s) are always the same with an offset (for example, CS of a ZC sequence) between the sub-sequence(s), and an OCC code is applied on this basis; where the states of the sub-sequence are specified by the protocol or configured or preconfigured by the network side device, and the states of the factor are specified by the protocol or configured or preconfigured by the network side device.

If the sub-sequence is a ZC sequence, its state may be represented by using CS. As described above, a CS state (or available sequence) and/or an OCC code state (or available sequence) may be specified by the protocol or configured or preconfigured by the network side device. Specifically, an available state (or available sequence) is explicitly indicated; or a defined state (or available sequence) appears in a particular order (for example, order of numbers); or an available state is indicated by a bitmap. For example, total sequences of a length-2 OCC code may be specified as (1) [+1,+1], (2) [+1, −1], (3) [−1,+1], and (4) [−1,−1], and a bitmap [1 0 1 0] may be used to indicate that (1) [+1, +1] and (3) [−1,+1] are available states.

Optionally, a quantity of information bits carried on each channel resource and a state of an occupied channel sequence are specified by the protocol or configured or preconfigured by the network side device. Information bits of each channel resource are determined based on a state of the channel sequence, and a sequence state that may be occupied by the channel resource may be specified by the protocol or configured or preconfigured.

Optionally, the method further includes:

scrambling the feedback channel by using a preset identifier, where the preset identifier is at least one of the following:

at least a part of a terminal identifier of a receive terminal;

at least a part of a terminal identifier of a transmit terminal;

at least a part of a group identifier (group ID) of a receive terminal; and at least a part of an in-group identifier of a receive terminal.

In this way, feedback information fed back to different UEs can be distinguished. For example, when a UE sends feedback information, the feedback information is scrambled by using (a part of) a TX UE ID, or is scrambled based on a type of received data. When the UE sends feedback for unicast transmission, the feedback information is scrambled by using (a part of) a RX UE ID. When the UE sends feedback for groupcast transmission, the feedback information is scrambled by using (a part of) a UE group ID.

Optionally, the feedback channel format employs frequency division multiplexing, and frequency division multiplexing information and a frequency division multiplexing manner of the feedback channel format are specified by the protocol or configured or preconfigured by the network side device, where the frequency division multiplexing information includes at least one of the following:
a start point of the feedback channel format in frequency domain;
an end point of the feedback channel format in frequency domain; and
a quantity of such feedback channel formats in frequency domain; and
the frequency division multiplexing manner includes at least one of the following:
the feedback channel format appears continuously in frequency domain; and
the feedback channel format appears with a gap in frequency domain.

With frequency division multiplexing used for PSFCH and the feedback channel format allowed to appear with a gap in frequency domain, the IBE effect can be alleviated.

Specifically, the quantity K of such feedback channel formats in frequency domain and the start point and the end point of the feedback channel format for mapping in frequency domain may be specified by the protocol or configured or preconfigured by the network side device. Alternatively, it is implicitly specified that a PSFCH occupies bandwidth of an entire resource pool or sub-channel in frequency domain, where if a quantity of PRBs is not an integer multiple of a sequence length of PSFCH or N PRBs, remaining PRBs may be left empty. In a specific example, it may be specified by the protocol or configured or preconfigured by the network side device that PSFCH channels appear continuously in frequency domain; or it may be specified by the protocol or configured or preconfigured by the network side device that PSFCH channels appear with a gap in frequency domain. For example, it is specified by the protocol or configured or preconfigured by the network side device that a gap between PSFCH channels is X PRBs in frequency domain, or a mask is specified by the protocol or configured or preconfigured by the network side device with a basic unit covered by the mask being N PRBs, where the mask may be a bitmap formed by binary symbols, and different symbol states represent channel enabling (disabling).

Optionally, at least one of the following uses a same feedback channel format:
at least one sub-channel;
one resource pool;
at least one subcarrier spacing (SCS);
at least one frequency band; and
at least one carrier.

Optionally, when a plurality of sub-channels use a same feedback channel format, the plurality of sub-channels are a plurality of consecutive sub-channels, and a start point of the plurality of sub-channels is specified by the protocol or configured or preconfigured by the network side device. For example, some sub-channels are used for unicast transmission, and some sub-channels are used for groupcast transmission. Different PSFCH configuration modes are used for unicast and groupcast.

For PSFCH configuration based on SCS, it may be specified by the protocol that one or more SCSs correspond to a particular PSFCH parameter (group). For example:

For an SCS of 15 kHz, N=8 PRBs and M=4 (meaning a sub-sequence occupies two PRBs).

For an SCS of 30 kHz, N=4 PRBs and M=2 (meaning a sub-sequence occupies two PRBs).

For an SCS of 60 kHz, N=2 PRBs and M=2 (meaning a sub-sequence occupies one PRB).

For an SCS of 120 kHz, N=1 PRB and M=1 (meaning a sub-sequence occupies one PRB).

Optionally, it may alternatively be specified by the protocol that one or more SCSs correspond to one of some PSFCH parameters (groups).

The foregoing technical solution for sub-channels is also applicable to frequency domain units.

Figure 5:
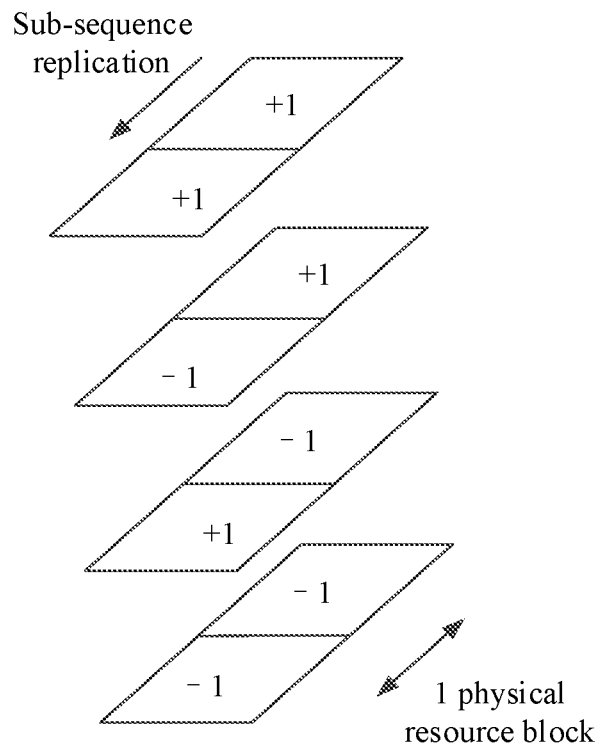
FIG. 5 is a schematic diagram of OCC mapping according to some embodiments of the present disclosure.

In a specific example, as shown in FIG. 5, a sub-sequence is specified to be 1 PRB long, a sequence length N=2 is configured for a PSFCH channel, one concatenation is performed for sub-sequence extension, and a length of a corresponding OCC is length-2 (including four states [+1,+1], [+1,−1], [−1,+1], and [−1,−1]). It is specified that the sub-sequence is a length-12 ZC sequence, and a channel sequence is continuously mapped onto REs. Two different CSs represent two different states, and CS states of two sub-sequences concatenated for extension are the same. Therefore, with CS and OCC used, a total quantity of sequence states is 2×4=8.

It is configured that each PSFCH channel resource carries 1 bit information and that each channel resource includes CS states of one OCC sequence and two ZC sequences. For example, OCC#0&CS#0 and OCC#0&CS6 are one channel resource that can be occupied by one UE, and four UEs may use eight sequence states through code division multiplexing.

Figure 6:
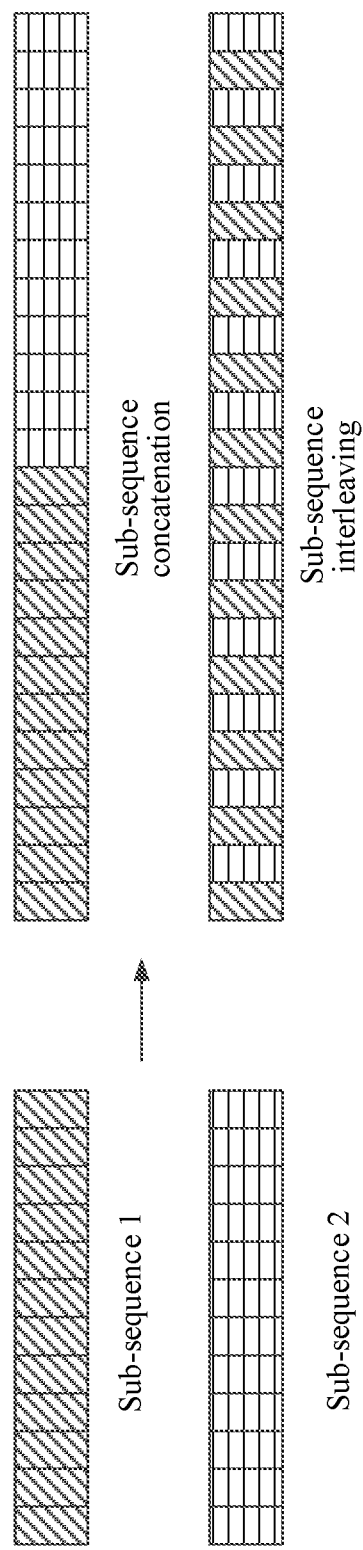
FIG. 6 is a schematic diagram of sub-sequence concatenation and sub-sequence interleaving according to some embodiments of the present disclosure.

In another specific example, as shown in FIG. 6, a channel sequence may be obtained by concatenating or interleaving a sub-sequence 1 and a sub-sequence 2.

Figure 7:
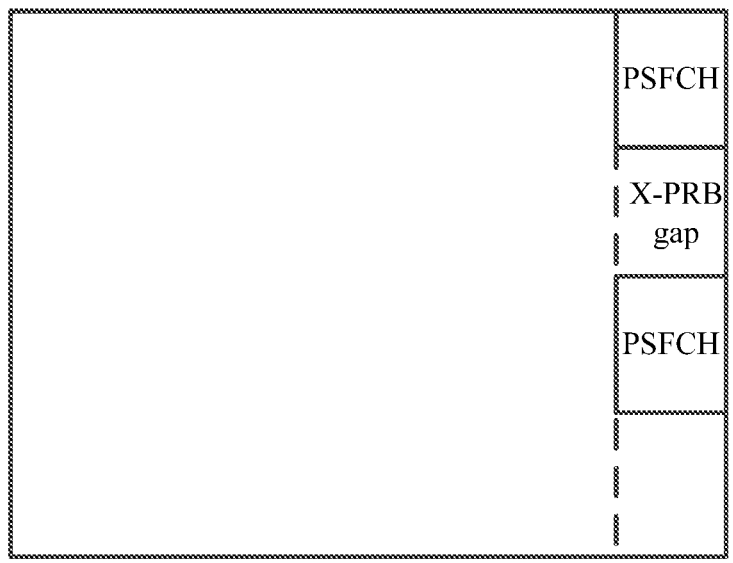
FIG. 7 is a schematic diagram illustrating PSFCH appearing with a gap according to some embodiments of the present disclosure.

In another specific example, as shown in FIG. 7, PSFCH is mapped starting from a start sub-carrier of a resource pool. If the protocol specifies that PSFCH appears with a gap of X PRBs, after being mapped onto N PRBs, PSFCH continues to be mapped after a gap of X PRBs until K mappings are completed. It should be noted that X may be an integer multiple of N.

Figure 8:
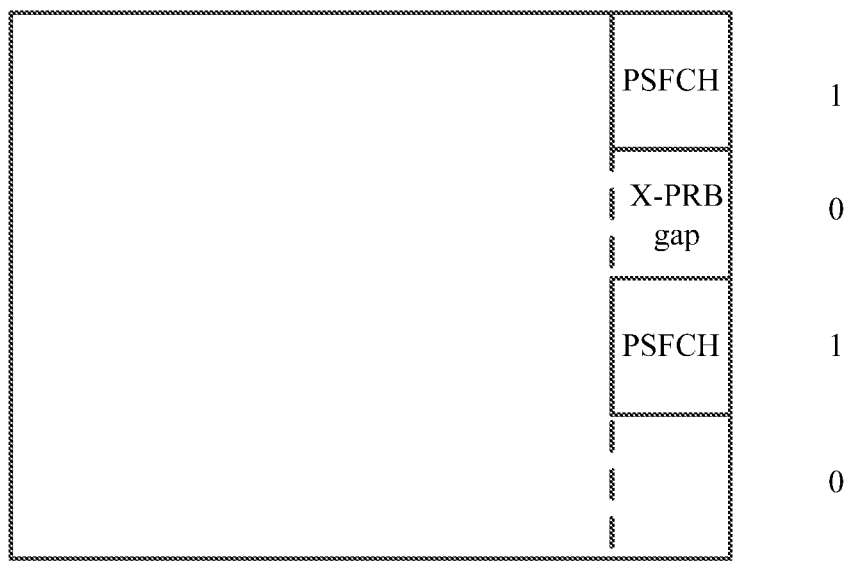
FIG. 8 is a schematic diagram illustrating PSFCH appearing with a gap with a mask used to enable PSFCH according to some embodiments of the present disclosure.

As shown in FIG. 8, if the protocol specifies that PSFCH appears with a gap and PSFCH is enabled (disabled) by using a mask, whether to enable PSFCH is determined per N PRBs. If a kth mask bit indicates 1, PSFCH is mapped starting from a [(k−1)×N]th PRB. On the contrary, if the kth mask bit indicates 0, PSFCH cannot be mapped onto PRBs in the gap [(k−1)×N, k×N−1].

Figure 9:
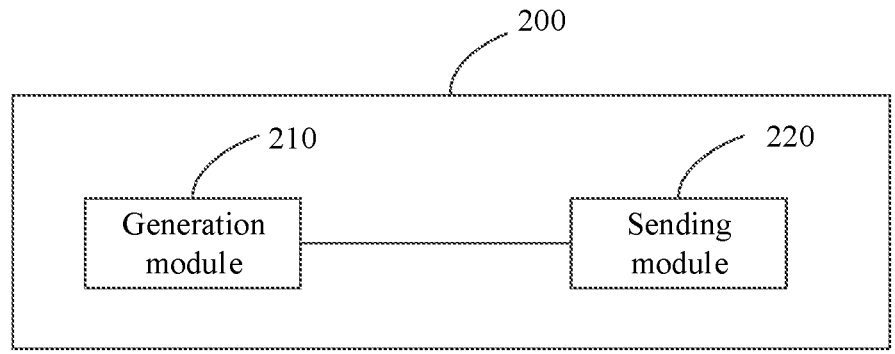
FIG. 9 is a structural block diagram of a feedback information transmission apparatus according to some embodiments of the present disclosure.

Some embodiments of the present disclosure further provide a feedback information transmission apparatus 200 applied to a receive terminal. As shown in FIG. 9, the apparatus includes:

a generation module 210, configured to obtain information about a feedback channel format, and generate a feedback channel according to the information about the feedback channel format, where the feedback channel format employs a sequence form; and a sending module 220, configured to send feedback information to a transmit terminal through the feedback channel.

In this embodiment, the receive terminal obtains information about a feedback channel format, and generates a feedback channel according to the information about the feedback channel format. The feedback channel format employs a sequence form which may be obtained through sub-sequence extension. In this way, the feedback channel has a large code length, effectively reducing the adjustment time for automatic gain control.

Optionally, the feedback information is sent after the receive terminal receives sidelink data information from the transmit terminal.

The feedback information transmission apparatus 200 in this embodiment can implement the feedback information transmission method in the foregoing embodiment, and achieve the same effects.

Optionally, the obtaining information about a feedback channel format includes obtaining configuration information of the feedback channel format, where the information about the feedback channel format includes N. The generation module 210 is specifically configured to generate a channel sequence that occupies N physical resource blocks PRBs, where N is specified by a protocol or configured or preconfigured by a network side device, and N is an integer greater than or equal to 1; and map the channel sequence onto resource elements REs.

Optionally, the information about the feedback channel format further includes M, the channel sequence includes M sub-sequences, and the generation module 210 is specifically configured to perform at least one of the following:

forming the channel sequence by using M correlated or uncorrelated different sequences;

replicating one sub-sequence M times to obtain the channel sequence;

multiplying at least one sub-sequence by a factor to obtain the channel sequence;

concatenating sub-sequences to obtain the channel sequence; and interleaving sub-sequences to obtain the channel sequence, where M is an integer greater than or equal to 1, M is specified by the protocol or configured or preconfigured by the network side device, a length of the sub-sequence is specified by the protocol or configured or preconfigured by the network side device, and a type of the sub-sequence is specified by the protocol or configured or preconfigured by the network side device. Generating a channel sequence through sub-sequence extension can effectively reduce an AGC adjustment time. In addition, with the near-far effect of code division multiplexing considered, code division multiplexing may be canceled.

Optionally, the factor is an orthogonal cover code (OCC), and a length of the orthogonal cover code is specified by the protocol or configured or preconfigured by the network side device. Alternatively, the length of the orthogonal cover code may be implicitly obtained, for example, the code length being equal to a quantity of sub-sequences.

Optionally, in the case of interleaving sub-sequences to obtain the channel sequence, a quantity of sub-sequences that are interleaved is specified by the protocol or configured or preconfigured by the network side device.

In this embodiment, a long sequence that occupies N PRBs may be directly generated as the channel sequence, or M identical or different sub-sequences may be combined to obtain an extended channel sequence that occupies N PRBs. M is a parameter specified by the protocol or configured or preconfigured by the network side device, and the length of the sub-sequence is also a parameter specified by the protocol or configured or preconfigured by the network side device. A length N of the channel sequence may be implicitly deduced from M. For example, if the protocol specifies that the sub-sequence occupies one PRB, M=N. In addition, the type of the sub-sequence may be specified by the protocol or configured by the network side device or preconfigured by the network side device. The sub-sequence may be a computer generated sequence (CGS), and/or a constant amplitude zero auto correlation (\CAZAC) sequence, where the CAZAC includes a ZC sequence (Zadoff Chu sequence).

Optionally, the generation module 210 is specifically configured to map the channel sequence onto resource elements in a comb manner or through continuous mapping.

When the protocol specifies that the channel sequence is mapped onto resource elements in the foregoing two mapping manners, one of the manners may be configured or preconfigured for mapping.

Optionally, in the case of mapping the channel sequence onto resource elements in a comb manner, a comb type is specified by the protocol or configured or preconfigured by the network side device, or may be indicated by using physical layer signaling (SCI), and the comb type includes at least one of the following: a quantity of REs for continuous mapping and a gap between REs for discontinuous mapping.

Optionally, a quantity of states of the channel sequence is specified by the protocol or configured or preconfigured by the network side device.

When the channel sequence includes M sub-sequences, the quantity of states of the channel sequence is any one of the following:

the quantity of states of the channel sequence is equal to a sum of quantities of states of sub-sequences, where sequence states of the sub-sequences are not correlated;

the quantity of states of the channel sequence is equal to a product of quantities of states of sub-sequences, where sequence states of the sub-sequences are not correlated;

the quantity of states of the channel sequence is equal to a quantity of states of a sub-sequence, where sequence states of the sub-sequences are always the same; and in the case of multiplying at least one sub-sequence by a factor to obtain the channel sequence, the quantity of states of the channel sequence is equal to a product of a quantity of states of the sub-sequence(s) and a quantity of states of the factor, where sequence states of the sub-sequence(s) are always the same with an offset (for example, CS of a ZC sequence) between the sub-sequence(s), and an OCC code is applied on this basis; where the states of the sub-sequence are specified by the protocol or configured or preconfigured by the network side device, and the states of the factor are specified by the protocol or configured or preconfigured by the network side device.

If the sub-sequence is a ZC sequence, its state may be represented by using CS. As described above, a CS state (or available sequence) and/or an OCC code state (or available sequence) may be specified by the protocol or configured or preconfigured by the network side device. Specifically, an available state (or available sequence) is explicitly indicated; or a defined state (or available sequence) appears in a particular order (for example, order of numbers); or an available state is indicated by a bitmap. For example, total sequences of a length-2 OCC code may be specified as (1) [+1,+1], (2) [+1,−1], (3) [−1,+1], and (4) [−1,−1], and a bitmap [1 0 1 0] may be used to indicate that (1) [+1,+1] and (3) [−1,+1] are available states.

Optionally, a quantity of information bits carried on each channel resource and a state of an occupied channel sequence are specified by the protocol or configured or preconfigured by the network side device. Information bits of each channel resource are determined based on a state of the channel sequence, and a sequence state that may be occupied by the channel resource may be specified by the protocol or configured or preconfigured.

Optionally, the apparatus further includes:

a scrambling module, configured to scramble the feedback channel by using a preset identifier, where the preset identifier is at least one of the following:

at least a part of a terminal identifier of a receive terminal;

at least a part of a terminal identifier of a transmit terminal;

at least a part of a group identifier (group ID) of a receive terminal; and at least a part of an in-group identifier of a receive terminal.

In this way, feedback information fed back to different UEs can be distinguished. For example, when a UE sends feedback information, the feedback information is scrambled by using (a part of) a TX UE ID, or is scrambled based on a type of received data. When the UE sends feedback for unicast (unicast) transmission, the feedback information is scrambled by using (a part of) a RX UE ID. When the UE sends feedback for groupcast transmission, the feedback information is scrambled by using (a part of) a UE group ID.

Optionally, the feedback channel format employs frequency division multiplexing, and frequency division multiplexing information and a frequency division multiplexing manner of the feedback channel format are specified by the protocol or configured or preconfigured by the network side device, where the frequency division multiplexing information includes at least one of the following:

a start point of the feedback channel format in frequency domain;

an end point of the feedback channel format in frequency domain; and a quantity of such feedback channel formats in frequency domain; and the frequency division multiplexing manner includes at least one of the following:

the feedback channel format appears continuously in frequency domain; and the feedback channel format appears with a gap in frequency domain.

With frequency division multiplexing used for PSFCH and the feedback channel format allowed to appear with a gap in frequency domain, the IBE effect can be alleviated. Specifically, the quantity K of such feedback channel formats in frequency domain and the start point and the end point of the feedback channel format for mapping in frequency domain may be specified by the protocol or configured or preconfigured by the network side device. Alternatively, it is implicitly specified that a PSFCH occupies bandwidth of an entire resource pool or sub-channel in frequency domain, where if a quantity of PRBs is not an integer multiple of a sequence length of PSFCH or N PRBs, remaining PRBs may be left empty. In a specific example, it may be specified by the protocol or configured or preconfigured by the network side device that PSFCH channels appear continuously in frequency domain; or it may be specified by the protocol or configured or preconfigured by the network side device that PSFCH channels appear with a gap in frequency domain. For example, it is specified by the protocol or configured or preconfigured by the network side device that a gap between PSFCH channels is X PRBs in frequency domain, or a mask is specified by the protocol or configured or preconfigured by the network side device with a basic unit covered by the mask being N PRBs, where the mask may be a bitmap formed by binary symbols, and different symbol states represent channel enabling (disabling).

Optionally, at least one of the following uses a same feedback channel format:

at least one sub-channel;

one resource pool;

at least one subcarrier spacing (SCS);

at least one frequency band; and at least one carrier.

Optionally, when a plurality of sub-channels use a same feedback channel format, the plurality of sub-channels are a plurality of consecutive sub-channels, and a start point of the plurality of sub-channels is specified by the protocol or configured or preconfigured by the network side device. For example, some sub-channels are used for unicast transmission, and some sub-channels are used for groupcast transmission. Different PSFCH configuration modes are used for unicast and groupcast.

For PSFCH configuration based on SCS, it may be specified by the protocol that one or more SCSs correspond to a particular PSFCH parameter (group). For example:

For an SCS of 15 kHz, N=8 PRBs and M=4 (meaning a sub-sequence occupies two PRBs).

For an SCS of 30 kHz, N=4 PRBs and M=2 (meaning a sub-sequence occupies two PRBs).

For an SCS of 60 kHz, N=2 PRBs and M=2 (meaning a sub-sequence occupies one PRB).

For an SCS of 120 kHz, N=1 PRB and M=1 (meaning a sub-sequence occupies one PRB).

Optionally, it may alternatively be specified by the protocol that one or more SCSs correspond to one of some PSFCH parameters (groups).

The foregoing technical solution for sub-channels is also applicable to frequency domain units.

Figure 10:
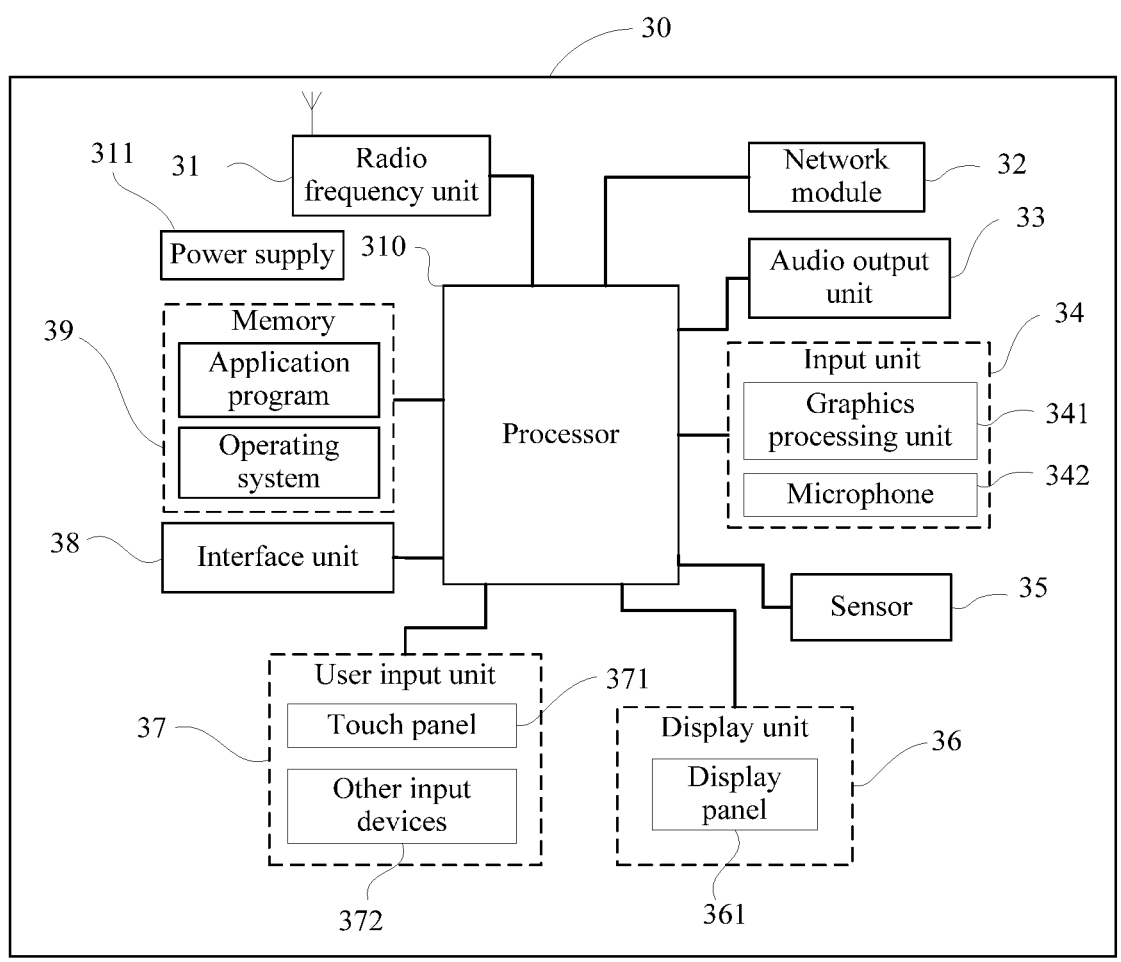
FIG. 10 is a block diagram of a terminal according to some embodiments of the present disclosure.

To better implement the foregoing objective, further, FIG. 10 is a schematic structural diagram of hardware of a terminal according to the embodiments of the present disclosure. A terminal 30 includes but is not limited to components such as a radio frequency unit 31, a network module 32, an audio output unit 33, an input unit 34, a sensor 35, a display unit 36, a user input unit 37, an interface unit 38, a memory 39, a processor 310, and a power supply 311. It can be understood by a person skilled in the art that, the terminal structure shown in FIG. 10 does not constitute any limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, and the like.

The processor 310 is configured to obtain information about a feedback channel format, and generate a feedback channel according to the information about the feedback channel format, where the feedback channel format employs a sequence form; and send feedback information to a transmit terminal through the feedback channel.

It should be understood that, in some embodiments of the present disclosure, the radio frequency unit 31 may be configured to receive/send a signal in an information receiving/sending or call process. Specifically, after receiving downlink data from a base station, the radio frequency unit 31 sends the downlink data to the processor 310 for processing. In addition, the radio frequency unit 31 sends uplink data to the base station. Typically, the radio frequency unit 31 includes but is not limited to an antenna, at least one amplifier, a transceiver, a coupler, a low noise amplifier, a duplexer, and the like. In addition, the radio frequency unit 31 may communicate with a network and other devices through a wireless communication system.

The terminal provides wireless broadband Internet access for the user by using the network module 32, for example, helping the user to send and receive e-mails, brows web pages, and access streaming media.

The audio output unit 33 may convert audio data received by the radio frequency unit 31 or the network module 32 or stored in the memory 39 into an audio signal and output the audio signal as a sound. In addition, the audio output unit 33 may further provide an audio output (for example, a call signal received sound, or a message received sound) related to a specific function implemented by the terminal 30. The audio output unit 33 includes a speaker, a buzzer, a telephone receiver, and the like.

The input unit 34 is configured to receive an audio signal or a video signal. The input unit 34 may include a graphics processing unit (GPU) 341 and a microphone 342, and the graphics processing unit 341 processes image data of a still picture or video obtained by an image capture apparatus (such as a camera) in a video capture mode or an image capture mode. A processed image frame may be displayed on the display unit 36. The image frame processed by the graphics processing unit 341 may be stored in the memory 39 (or another storage medium) or sent by using the radio frequency unit 31 or the network module 32. The microphone 342 may receive a sound and can process such sound into audio data. Processed audio data may be converted, in a call mode, into a format that can be sent to a mobile communication base station by using the radio frequency unit 31 for output.

The terminal 30 further includes at least one type of sensor 35, such as an optical sensor, a motion sensor, and other sensors. Specifically, the optical sensor includes an ambient light sensor and a proximity sensor. The ambient light sensor may adjust luminance of the display panel 361 based on brightness of ambient light. The proximity sensor may turn off the display panel 361 and/or backlight when the terminal 30 moves to an ear. As a type of the motion sensor, an accelerometer sensor may detect accelerations in various directions (typically, three axes), and detect a value and a direction of gravity when the accelerometer sensor is static, and may be used for terminal posture recognition (such as screen switching between landscape and portrait modes, related games, or magnetometer posture calibration), functions related to vibration recognition (such as pedometer or tapping), and the like. The sensor 35 may further include a fingerprint sensor, a pressure sensor, an iris sensor, a molecular sensor, a gyroscope, a barometer, a hygrometer, a thermometer, an infrared sensor, and the like. Details are not described herein.

The display unit 36 is configured to display information input by a user or information provided to a user. The display unit 36 may include a display panel 361. The display panel 361 may be configured in a form of a liquid crystal display (LCD), an organic light-emitting diode (OLED), or the like.

The user input unit 37 may be configured to receive input digit or character information, and generate key signal input related to user setting and function control of the terminal. Specifically, the user input unit 37 includes a touch panel 371 and other input devices 372. The touch panel 371, also referred to as a touchscreen, may collect a touch operation performed by a user on or near the touch panel 371 (for example, an operation performed by a user on the touch panel 371 or near the touch panel 371 by using any appropriate object or accessory, such as a finger or a stylus). The touch panel 371 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 310, and receives and executes a command sent by the processor 310. In addition, the touch panel 371 may be implemented in various types, for example, as a resistive, capacitive, infrared, or surface acoustic wave touch panel. The user input unit 37 may include other input devices 372 in addition to the touch panel 371. Specifically, the other input devices 372 may include but are not limited to a physical keyboard, a functional button (such as a volume control button or a power on/off button), a trackball, a mouse, and a joystick. Details are not described herein.

Further, the touch panel 371 may cover the display panel 361. When detecting a touch operation on or near the touch panel 371, the touch panel 371 transmits the touch operation to the processor 310 for determining a type of the touch event, and then the processor 310 provides corresponding visual output on the display panel 361 based on the type of the touch event. Although the touch panel 371 and the display panel 361 are used as two separate parts in FIG. 10 to implement input and output functions of the terminal, in some embodiments, the touch panel 371 and the display panel 361 may be integrated to implement the input and output functions of the terminal. This is not specifically limited herein.

The interface unit 38 is an interface for connecting an external apparatus to the terminal 30. For example, the external apparatus may include a wired or wireless headphone port, an external power supply (or battery charger) port, a wired or wireless data port, a storage card port, a port for connecting an apparatus having an identity module, an audio input/output (I/O) port, a video I/O port, an earphone port, and the like. The interface unit 38 may be configured to receive input (for example, data information and power) from an external apparatus and transmit the received input to one or more elements in the terminal 30 or may be configured to transmit data between the terminal 30 and an external apparatus.

The memory 39 may be configured to store software programs and various data. The memory 39 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 39 may include a high-speed random access memory, and may further include a nonvolatile memory, for example, at least one magnetic disk storage device, a flash storage device, or other volatile solid-state storage devices.

The processor 310 is a control center of the terminal, which connects all parts of the terminal by using various interfaces and lines. By running or executing software programs and/or modules stored in the memory 39 and invoking data stored in the memory 39, the processor 310 performs various functions and data processing of the terminal, to implement overall monitoring on the terminal. The processor 310 may include one or more processing units. Optionally, an application processor and a modem processor may be integrated into the processor 310. The application processor mainly processes an operating system, a user interface, an application program, and the like. The modem processor mainly processes wireless communications. It can be understood that the modem processor may alternatively not be integrated into the processor 310.

The terminal 30 may further include the power supply 311 (such as a battery) that supplies power to the components. Optionally, the power supply 311 may be logically connected to the processor 310 through a power management system, so as to implement functions such as charging, discharging, and power consumption management through the power management system.

In addition, the terminal 30 includes some function modules not shown, for which details are not described herein.

Optionally, some embodiments of the present disclosure further provide a terminal, including a processor 310, a memory 39, and a computer program that is stored in the memory 39 and capable of running on the processor 310. When the computer program is executed by the processor 310, the processes of the foregoing feedback information transmission method embodiment are implemented with the same technical effects achieved. To avoid repetition, details are not described herein again. The terminal may be a wireless terminal or a wired terminal. The wireless terminal may be a device that provides a user with voice and/or data connectivity for other services, a handheld device having a wireless connection function, or other processing devices connected to a wireless modem. The wireless terminal may communicate with one or more core networks through a radio access network (\RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device (User Device or User Equipment). This is not limited herein.

Some embodiments of the present disclosure further provide a computer-readable storage medium. The computer-readable storage medium stores a computer program, and when the computer program is executed by a processor, the processes of the foregoing feedback information transmission method embodiment are implemented with the same technical effects achieved. To avoid repetition, details are not described herein again. The computer-readable storage medium includes a read-only memory (ROM), a random access memory (RAM), a magnetic disk, or an optical disc.

A person of ordinary skill in the art may be aware that the units and algorithm steps in the examples described with reference to the embodiments disclosed in this specification may be implemented by electronic hardware or a combination of computer software and electronic hardware. Whether the functions are executed by hardware or software depends on particular applications and design constraints of the technical solutions. A person skilled in the art may use a different method to implement the described functions for each particular application, but it should not be considered that the implementation goes beyond the scope of the present disclosure.

It can be clearly understood by a person skilled in the art that, for the purpose of convenient and brief description, for a detailed operating process of the foregoing system, apparatus, or unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate. Parts displayed as units may or may not be physical units, meaning they may be located in one position or distributed on a plurality of network units. Some or all of the units may be selected based on actual requirements to achieve the objectives of the solutions in the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

It can be understood that some embodiments of the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof for performing the functions in this application.

In addition, it should be noted that in the apparatus and method of the present disclosure, it is obvious that the components or steps may be decomposed and/or recombined. Such decomposition and/or recombination shall be considered to be equivalent solutions of the present disclosure. In addition, the steps for performing the foregoing series of processing may be performed in a chronological order, but do not necessarily need to be performed in a chronological order. Some steps may be performed in parallel or independently. A person of ordinary skill in the art can understand that all or any of the steps or components of the method and the apparatus in the present disclosure may be implemented in any computing apparatus (including a processor, a storage medium, and the like) or a network of computing apparatuses through hardware, firmware, software, or a combination thereof. This can be implemented by a person of ordinary skill in the art who has read the descriptions of the present disclosure, by using their basic programming skills.

Therefore, the objective of the present disclosure may also be implemented by running a program or a group of programs on any computing apparatus. The computing apparatus may be a well-known general apparatus. Therefore, the objective of the present disclosure may also be implemented by providing only a program product that includes program code for implementing the method or apparatus. In other words, such a program product also constitutes the present disclosure, and a storage medium that stores such a program product also constitutes the present disclosure. Apparently, the storage medium may be any well-known storage medium or any storage medium to be developed in the future. It should also be noted that in the apparatus and method of the present disclosure, it is obvious that the components or steps may be decomposed and/or recombined. Such decomposition and/or recombination shall be considered to be equivalent solutions of the present disclosure. In addition, the steps for performing the foregoing series of processing may be performed in a chronological order, but do not necessarily need to be performed in a chronological order. Some steps may be performed in parallel or independently.

The foregoing descriptions are merely optional implementations of the present disclosure. It should be noted that a person of ordinary skill in the art may make improvements and polishing without departing from the principle of the present disclosure and such improvements and polishing shall fall within the protection scope of the present disclosure.

What is claimed is:

1. A feedback information transmission method, comprising:
    obtaining, by a receive terminal, information about a feedback channel format, and generating a feedback channel according to the information about the feedback channel format, wherein the feedback channel format employs a sequence form; and
    sending, by the receive terminal, feedback information to a transmit terminal through the feedback channel;
    wherein the feedback channel format employs frequency division multiplexing, and frequency division multiplexing information and a frequency division multiplexing manner of the feedback channel format are specified by the protocol or configured or preconfigured by the network side device, wherein
    the frequency division multiplexing information comprises at least one of the following:
    a start point of the feedback channel format in frequency domain;
    an end point of the feedback channel format in frequency domain; and
    a quantity of such feedback channel formats in frequency domain; and
    the frequency division multiplexing manner comprises at least one of the following:
    the feedback channel format appears continuously in frequency domain; and
    the feedback channel format appears with a gap in frequency domain.

2. The feedback information transmission method according to claim 1, further comprising:
    scrambling the feedback channel by using a preset identifier, wherein the preset identifier is at least one of the following:
    at least a part of a terminal identifier of a receive terminal;
    at least a part of a terminal identifier of a transmit terminal;
    at least a part of a group identifier of a receive terminal; and
    at least a part of an in-group identifier of a receive terminal.

3. The feedback information transmission method according to claim 1, wherein the information about the feedback channel format comprises N, and the generating a feedback channel comprises:

generating a channel sequence that occupies N physical resource blocks (PRBs), wherein N is specified by a protocol or configured or preconfigured by a network side device, and N is an integer greater than or equal to 1; and mapping the channel sequence onto resource elements (REs).

4. The feedback information transmission method according to claim 3, wherein the information about the feedback channel format further comprises M, the channel sequence comprises M sub-sequences, and the generating a channel sequence comprises at least one of the following:

forming the channel sequence by using M correlated or uncorrelated different sequences;

replicating one sub-sequence M times to obtain the channel sequence;

multiplying at least one sub-sequence by a factor to obtain the channel sequence;

concatenating sub-sequences to obtain the channel sequence; and interleaving sub-sequences to obtain the channel sequence, wherein M is an integer greater than or equal to 1, M is specified by the protocol or configured or preconfigured by the network side device, a length of the sub-sequence is specified by the protocol or configured or preconfigured by the network side device, and a type of the sub-sequence is specified by the protocol or configured or preconfigured by the network side device.

5. The feedback information transmission method according to claim 4, wherein the factor is an orthogonal cover code, and a length of the orthogonal cover code is specified by the protocol or configured or preconfigured by the network side device.

6. The feedback information transmission method according to claim 4, wherein in the case of interleaving sub-sequences to obtain the channel sequence, a quantity of sub-sequences that are interleaved is specified by the protocol or configured or preconfigured by the network side device.

7. The feedback information transmission method according to claim 3, wherein the mapping the channel sequence onto resource elements comprises:

mapping the channel sequence onto resource elements in a comb manner or through continuous mapping.

8. The feedback information transmission method according to claim 7, wherein in the case of mapping the channel sequence onto resource elements in a comb manner, a comb type is specified by the protocol or configured or preconfigured by the network side device, and the comb type comprises at least one of the following: a quantity of REs for continuous mapping and a gap between REs for discontinuous mapping.

9. The feedback information transmission method according to claim 3, wherein a quantity of states of the channel sequence is any one of the following:

the quantity of states of the channel sequence is equal to a sum of quantities of states of sub-sequences;

the quantity of states of the channel sequence is equal to a product of quantities of states of sub-sequences;

the quantity of states of the channel sequence is equal to a quantity of states of a sub-sequence; and in the case of multiplying at least one sub-sequence by a factor to obtain the channel sequence, the quantity of states of the channel sequence is equal to a product of a quantity of states of the sub-sequence(s) and a quantity of states of the factor; wherein the states of the sub-sequence are specified by the protocol or configured or preconfigured by the network side device, and the states of the factor are specified by the protocol or configured or preconfigured by the network side device.

10. The feedback information transmission method according to claim 9, wherein a quantity of information bits carried in each channel resource and a state of an occupied channel sequence are specified by the protocol or configured or preconfigured by the network side device.

11. The feedback information transmission method according to claim 1, wherein at least one of the following uses a same feedback channel format:

at least one sub-channel;
one resource pool;
at least one subcarrier spacing;
at least one frequency band; and
at least one carrier.

12. The feedback information transmission method according to claim 11, wherein when a plurality of sub-channels use a same feedback channel format, the plurality of sub-channels are a plurality of consecutive sub-channels, and a start point of the plurality of sub-channels is specified by the protocol or configured or preconfigured by the network side device.

13. A terminal, comprising a processor, a memory, and a computer program that is stored in the memory and capable of running on the processor, wherein when the computer program is executed by the processor, the steps of the feedback information transmission method are implemented, the method comprises:

obtaining information about a feedback channel format, and generating a feedback channel according to the information about the feedback channel format, wherein the feedback channel format employs a sequence form; and sending feedback information to a transmit terminal through the feedback channel;

wherein the feedback channel format employs frequency division multiplexing, and frequency division multiplexing information and a frequency division multiplexing manner of the feedback channel format are specified by the protocol or configured or preconfigured by the network side device, wherein the frequency division multiplexing information comprises at least one of the following:

a start point of the feedback channel format in frequency domain;

an end point of the feedback channel format in frequency domain; and a quantity of such feedback channel formats in frequency domain; and the frequency division multiplexing manner comprises at least one of the following:

the feedback channel format appears continuously in frequency domain; and the feedback channel format appears with a gap in frequency domain.

14. The terminal according to claim 13, wherein the information about the feedback channel format comprises N, and the generating a feedback channel comprises:

generating a channel sequence that occupies N physical resource blocks (PRBs), wherein N is specified by a protocol or configured or preconfigured by a network side device, and N is an integer greater than or equal to 1; and mapping the channel sequence onto resource elements (REs).

15. The terminal according to claim 14, wherein the information about the feedback channel format further comprises M, the channel sequence comprises M sub-sequences, and the generating a channel sequence comprises at least one of the following:
   forming the channel sequence by using M correlated or uncorrelated different sequences;
   replicating one sub-sequence M times to obtain the channel sequence;
   multiplying at least one sub-sequence by a factor to obtain the channel sequence;
   concatenating sub-sequences to obtain the channel sequence; and
   interleaving sub-sequences to obtain the channel sequence, wherein
   M is an integer greater than or equal to 1, M is specified by the protocol or configured or preconfigured by the network side device, a length of the sub-sequence is specified by the protocol or configured or preconfigured by the network side device, and a type of the sub-sequence is specified by the protocol or configured or preconfigured by the network side device.

16. The feedback information transmission method according to claim 14, wherein a quantity of states of the channel sequence is any one of the following:
   the quantity of states of the channel sequence is equal to a sum of quantities of states of sub-sequences;
   the quantity of states of the channel sequence is equal to a product of quantities of states of sub-sequences;
   the quantity of states of the channel sequence is equal to a quantity of states of a sub-sequence; and
   in the case of multiplying at least one sub-sequence by a factor to obtain the channel sequence, the quantity of states of the channel sequence is equal to a product of a quantity of states of the sub-sequence(s) and a quantity of states of the factor; wherein
   the states of the sub-sequence are specified by the protocol or configured or preconfigured by the network side device, and the states of the factor are specified by the protocol or configured or preconfigured by the network side device.

17. The feedback information transmission method according to claim 16, wherein
   a quantity of information bits carried in each channel resource and a state of an occupied channel sequence are specified by the protocol or configured or preconfigured by the network side device.

18. The feedback information transmission method according to claim 13, further comprising:
   scrambling the feedback channel by using a preset identifier, wherein the preset identifier is at least one of the following:
   at least a part of a terminal identifier of a receive terminal;
   at least a part of a terminal identifier of a transmit terminal;
   at least a part of a group identifier of a receive terminal; and
   at least a part of an in-group identifier of a receive terminal.

19. A non-transitory computer-readable storage medium, wherein the non-transitory computer-readable storage medium stores a computer program, and when the computer program is executed by a processor, the steps of the feedback information transmission method according are implemented, the method comprises:
   obtaining, by a receive terminal, information about a feedback channel format, and generating a feedback channel according to the information about the feedback channel format, wherein the feedback channel format employs a sequence form; and
   sending, by the receive terminal, feedback information to a transmit terminal through the feedback channel;
   wherein the feedback channel format employs frequency division multiplexing, and frequency division multiplexing information and a frequency division multiplexing manner of the feedback channel format are specified by the protocol or configured or preconfigured by the network side device, wherein
   the frequency division multiplexing information comprises at least one of the following:
   a start point of the feedback channel format in frequency domain;
   an end point of the feedback channel format in frequency domain; and
   a quantity of such feedback channel formats in frequency domain; and
   the frequency division multiplexing manner comprises at least one of the following:
   the feedback channel format appears continuously in frequency domain; and
   the feedback channel format appears with a gap in frequency domain.

\* \* \* \* \*